United States Patent
Neira et al.

(10) Patent No.: US 9,934,800 B1
(45) Date of Patent: Apr. 3, 2018

(54) PLASMONIC COUPLER USED WITH NEAR-FIELD TRANSDUCER

(71) Applicant: Seagate Technology LLC, Cupertino, CA (US)

(72) Inventors: Andres David Barbosa Neira, Derry (GB); Roberto Fernandez Garcia, Derry (GB); Michael James Hardy, Londonderry (GB); Mark Anthony Gubbins, Donegal (IE); Martin Giles Blaber, Plymouth, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/435,583

(22) Filed: Feb. 17, 2017

Related U.S. Application Data

(60) Provisional application No. 62/301,144, filed on Feb. 29, 2016, provisional application No. 62/344,583, filed on Jun. 2, 2016.

(51) Int. Cl.
| | | |
|---|---|---|
| *G11B 11/00* | (2006.01) | |
| *G11B 5/48* | (2006.01) | |
| *G11B 5/00* | (2006.01) | |
| *G11B 5/60* | (2006.01) | |
| *G11B 11/105* | (2006.01) | |
| *G11B 7/126* | (2012.01) | |

(52) U.S. Cl.
CPC .......... *G11B 5/4866* (2013.01); *G11B 5/6088* (2013.01); *G11B 7/126* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 2012/0020194 A1* | 1/2012 | Jin | G11B 5/1278 369/13.13 |
| 2012/0045662 A1* | 2/2012 | Zou | G11B 5/3133 428/810 |
| 2012/0328240 A1* | 12/2012 | Ma | B82Y 20/00 385/33 |
| 2013/0330573 A1* | 12/2013 | Zhao | G11B 5/3133 428/814 |
| 2015/0170675 A1 | 6/2015 | Shimazawa et al. | |
| 2015/0179197 A1 | 6/2015 | Clinton et al. | |
| 2016/0125901 A1* | 5/2016 | Lee | G11B 5/3133 369/13.33 |

* cited by examiner

*Primary Examiner* — Tan X Dinh
(74) *Attorney, Agent, or Firm* — Hollingsworth Davis, LLC

(57) ABSTRACT

A waveguide has a first cladding layer surrounding a near-field transducer. A core of the waveguide is disposed on the first cladding layer, and a second cladding layer is disposed on the core opposite the first cladding layer. A coupler is formed of a second plasmonic material and disposed in the waveguide such that a first edge of the coupler is proximate a media-facing surface and a first side of the coupler faces and is spaced apart from a peg of the near-field transducer in a downtrack direction.

18 Claims, 9 Drawing Sheets

PLASMONIC COUPLER USED WITH NEAR-FIELD TRANSDUCER

RELATED PATENT DOCUMENTS

This application claims the benefit of Provisional Patent Application Ser. No. 62/301,144 filed on Feb. 29, 2016, and 62/344,583 filed on Jun. 2, 2016, to which priority is claimed pursuant to 35 U.S.C. § 119(e), and which are incorporated herein by reference in their entirety.

SUMMARY

The present disclosure is related to a plasmonic coupler used with a near-field transducer. In one embodiment, a waveguide has a first cladding layer surrounding a near-field transducer. A core of the waveguide is disposed on the first cladding layer, and a second cladding layer is disposed on the core opposite the first cladding layer. A coupler is formed of a second plasmonic material and disposed in the waveguide such that a first edge of the coupler is proximate a media-facing surface and a first side of the coupler faces and is spaced apart from a peg of the near-field transducer in a downtrack direction.

In another embodiment, a near-field transducer has a plate-like enlarged portion disposed on a first substrate parallel plane and a peg extending from the enlarged portion towards a media-facing surface. A coupler is located separate from the near-field transducer on a second substrate parallel plane. The plasmonic coupler has two triangular sections comprising sides facing the near-field transducer at a non-zero angle relative to the media facing surface. A waveguide delivers light to the near-field transducer and the plasmonic coupler.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer of a recording medium (e.g., magnetic disk) at elevated temperatures. The heated area (e.g., hot spot) in the storage layer determines the data bit dimension. One way to achieve a tiny, confined hot spot is to use a recording head with an optical near-field transducer (NFT), such as a plasmonic optical antenna or an aperture, integrated in an optical waveguide of high contrast in the index of refraction between the waveguide core and its claddings. A magnetic pole is placed in close proximity (e.g., 20-50 nm) to the NFT at the media-facing surface of the recording head.

In the following disclosure, apparatuses (e.g., HAMR read/write heads) are described with features that may be used with an NFT that improve performance. For example, a plasmonic coupler is described that can sharpen an electromagnetic field of the NFT and thereby improve the thermal gradient of the hotspot on the recording medium. Such a coupler may be used alone or together with a leading magnetic shield used to improve magnetic performance of the read/write head.

Figure 1:
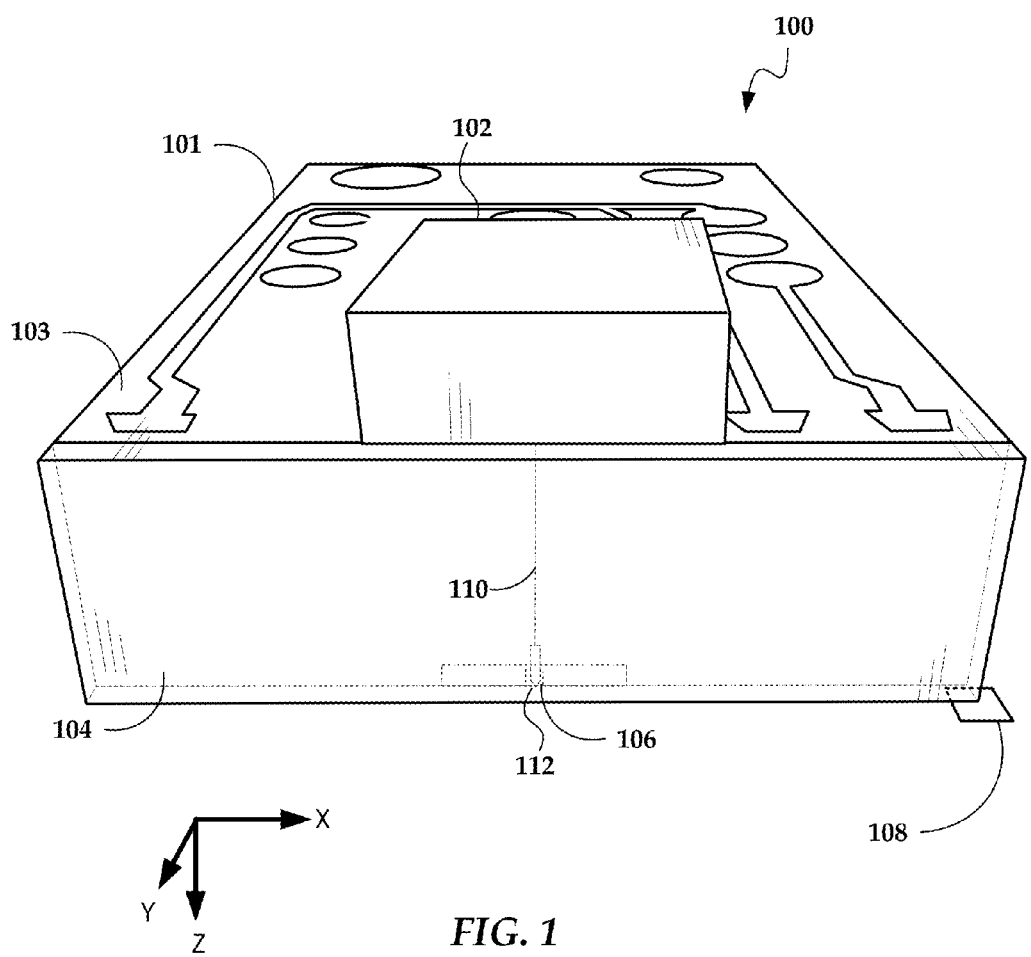
FIG. 1 is a perspective view of a slider assembly according to an example embodiment.

In reference to FIG. 1, a perspective view shows a HAMR recording head 100 according to an example embodiment. The recording head 100 may also be referred to as a slider, read head, write head, read/write head, etc. The recording head 100 includes a laser diode 102 located on mounting surface 103 of a slider body 101. The laser diode may be directly mounted as shown or by way of a submount. In this example, the mounting surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of gas.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via NFT 112. The NFT 112 is located near the read/write transducer 106 and causes heating of the media during recording operations. The NFT 112 may be made from materials such as gold, silver, copper, etc., with good plasmonic resonance properties. Some parts of the NFT 112 may be formed from materials with better mechanical and thermal robustness (although with somewhat less ideal plasmonic resonance performance), such as rhodium, platinum, iridium, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., directly on the surface or in a pocket or cavity) such that the light is emitted in a direction perpendicular to the media-facing surface (along the z-direction in this view).

Figure 2:
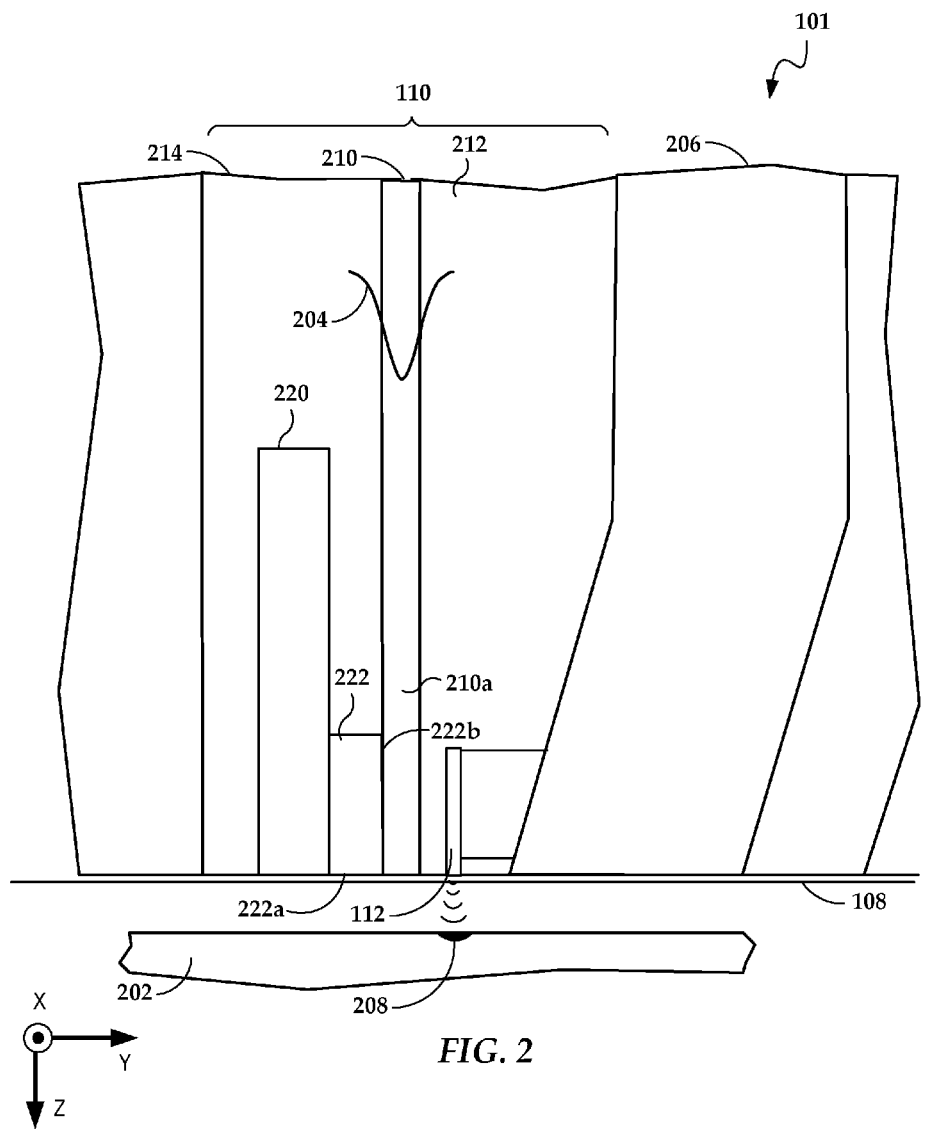
FIG. 2 is a cross-sectional view illustrating details of the slider of FIG. 1.

In FIG. 2, a cross-sectional view illustrates portions of the slider body 101 near the near-field transducer 112 according to an example embodiment. In this view, the NFT 112 is shown proximate to a surface of magnetic recording medium 202, e.g., a magnetic disk. The waveguide system 110 delivers electromagnetic energy 204 to the NFT 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (y-direction).

The waveguide system 110 includes a core layer 210 surrounded by cladding layers 212, 214. The core layer 210 may be made from dielectric of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon), etc. The cladding layers 212, 214 may each be formed of a dielectric material having a refractive index lower than the core, such as $Al_2O_3$ (aluminum oxide), SiO, $SiO_2$ (silica), SiOxNy (silicon oxynitride), and AlN (aluminum nitride). This arrangement of materials facilitates efficient propagation of light through the waveguide system 110.

A first end (not shown) of the core 210 extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the NFT 112.

Also seen in FIG. 2 is a magnetic leading shield 220 that can be used to improve magnetic performance of the head. Due to the proximity of the magnetic leading shield 220 to the NFT 112, optical performance of the NFT 112 may be impacted. In order to mitigate such an impact, a coupler 222 that is formed of a plasmonic material is in the cladding layer 214 such that a first edge 222a of the coupler 222 is proximate the media-facing surface 108 and a first side of the coupler 222b faces the core 210. In some embodiments below, the coupler 222 may be configured as a plate, disk or stadium shaped block, multiple triangular sections, etc. In some embodiments, the coupler 222 may be used without a magnetic leading shield 220. The coupler 222 may also be referred to as a secondary transducer or bottom cladding plate/disc.

Figure 3:
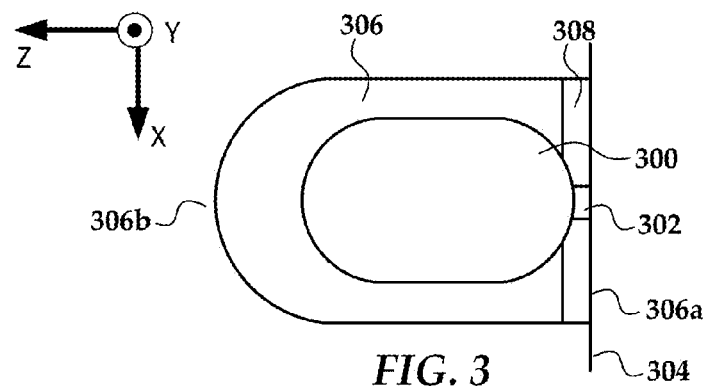
FIGS. 3, 4 and 5, are diagrams illustrating a configuration of a coupler according to an example embodiment.
Figure 4:
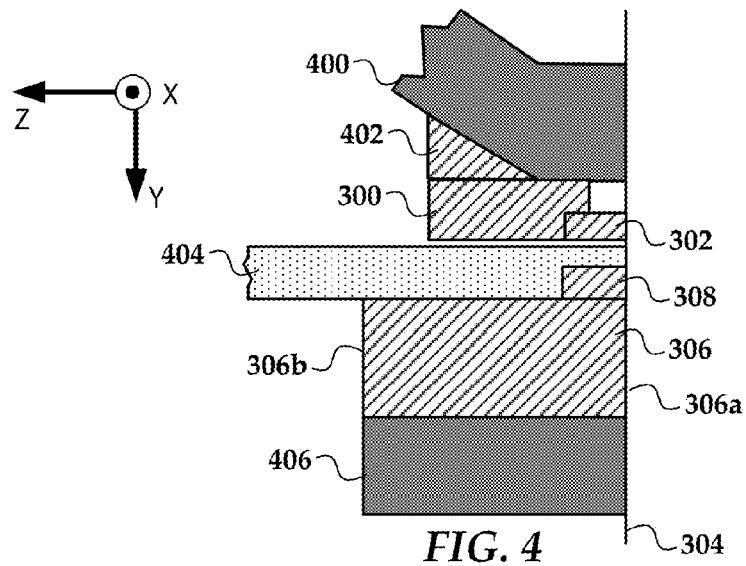
Figure 5:
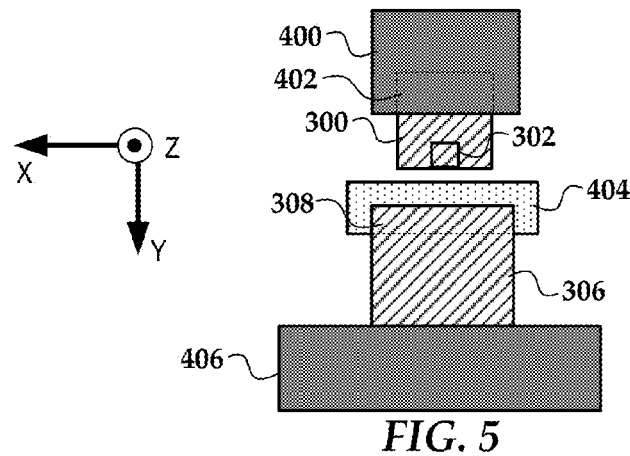

In FIGS. 3, 4 and 5, diagrams illustrate a configuration of a coupler according to an example embodiment. In FIG. 3, a top view of a substrate-parallel plane shows an enlarged portion 300 and peg 302 that together form an NFT. The enlarged portion 300 has a stadium (or capsule) shape, and the peg 302 extends from the enlarged portion 300 to a media-facing surface 304 (e.g., ABS). The enlarged portion 300 may have other shapes, such as a triangle, circle, rectangle, etc. The enlarged portion 300 is formed of a plasmonic material (e.g., Au, Ag, Cu) and the peg 302 may be formed of the same or different material. For example, the peg 302 may be formed from Pt or Rh.

As seen in FIG. 3, a coupler 306 overlaps the enlarged portion 300 of the NFT. The coupler has a first, rectangular edge 306a at the media-facing surface 304 and a second, rounded edge 306b facing away from the media surface 304. The coupler 306 is formed of a plasmonic material, which may be the same or different than that of the NFT. The rounded edge 306b of the coupler 306 generally corresponds to that of the rounded end of the NFT enlarged portion 300, and may have a different shape if the enlarged portion 300 utilizes a different profile as noted above. At the first edge 306a of the coupler 306, a protrusion 308 (also referred to as an optical shield) extends upwards towards the peg 302 in the y-direction. The coupler 306 and optical shield 308 may be formed of the same material, e.g., a plasmonic material. Other materials may be used for part of or the whole optical shield 308, e.g., a thermally robust material, a mechanically robust material, a metal or dielectric that is resistant to corrosion, etc.

In FIG. 4, a cross-sectional view along a downtrack plane shows additional components together with the NFT and coupler 306 of FIG. 3. These components are also seen in FIG. 5, which is a view seen from the media-facing surface 304. A write pole 400 extends towards the media-facing surface 304 proximate the base portion 300 and peg 302 of the NFT. A heat sink 402 extends between the base portion 300 and write pole 402 and draws away heat from the NFT. A waveguide core 404 extends towards the media-facing surface 304 and couples light into the NFT. Note that the optical shield 308, which has a rectangular profile in this view, extends into the core 404 towards the peg 302 of the NFT.

A leading magnetic shield 406 is located on or near a surface of the coupler 306 that faces away from the core 404. The magnetic shield 406 may be formed of a magnetic material similar to that used by the write pole 400, and in some embodiments may extend further away from the media-facing surface 304 in the positive z-direction than is shown in FIG. 4. The magnetic shield 406 improves magnetic performance of the read/write head.

Figure 6:
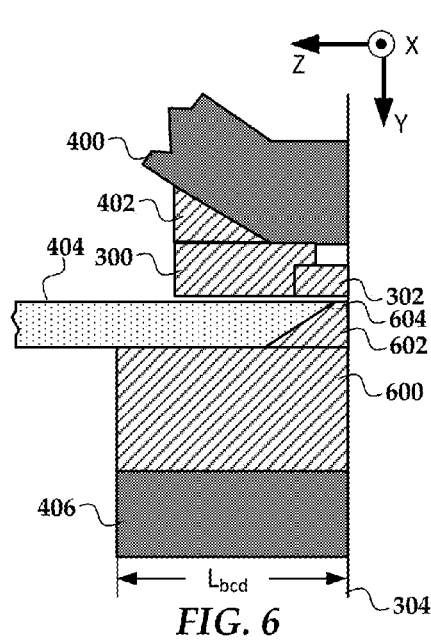
FIGS. 6 and 7 are cross-sectional and perspective views showing a coupler according to another example embodiment.
Figure 7:
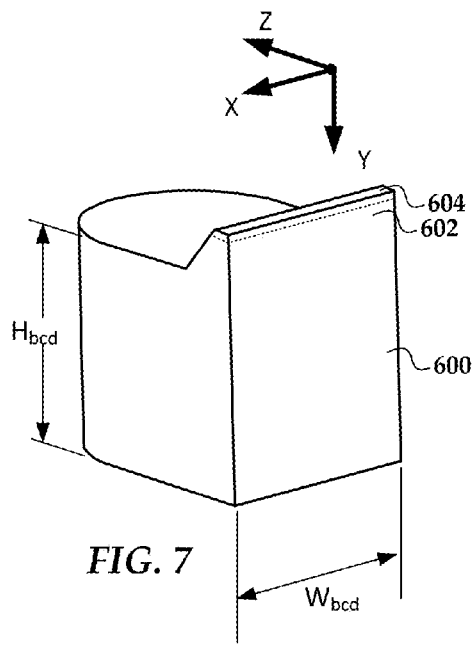

In FIG. 6, a cross-section view shows a coupler according to another example embodiment. For purposes of convenience, similar components in FIG. 6 are identified using the same reference numerals as corresponding components shown in FIGS. 3-5. In this example the optical shield 602 extending from the coupler 600 has an angled, wedge-shaped cross-section. The coupler 600 and optical shield 602 are also seen in the perspective view of FIG. 7. The coupler 600 again has a rectangular-shaped edge facing the media-facing surface 304 and a rounded edge facing away from this surface 304. Both of these components 600, 602 can be made from a plasmonic metal (e.g., Au). As indicated by region 604, a mechanically robust material (e.g., Ru, Pd, Pt, Rh) cap may be used on top of the optical shield 602.

Figure 8:
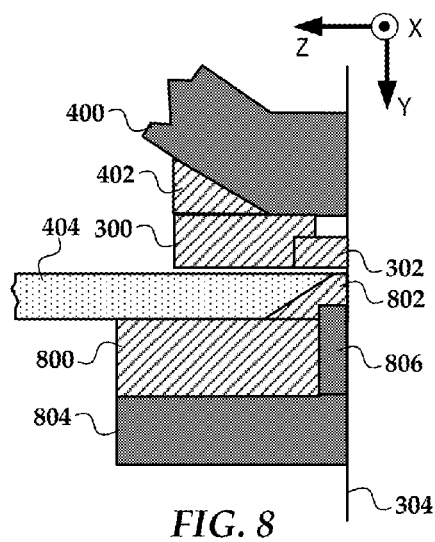
FIGS. 8 and 9 are cross-sectional and media-facing surface views showing a coupler according to another example embodiment.
Figure 9:
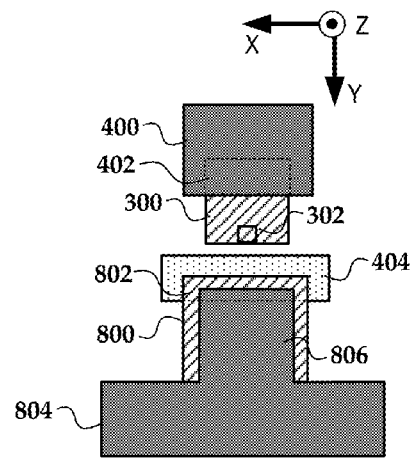

In FIGS. 8 and 9, respective cross-sectional and media-facing surface views show a coupler according to another example embodiment, again identifying similar components using the same reference numerals as those in FIGS. 3-5. The coupler 800 may again include a half-rectangular and half-rounded shape previously shown, along with a wedge-shaped optical shield 802. In this example, a magnetic leading shield 807 includes a protrusion 806 that extends in a downtrack direction up to the optical coupler 802. As seen in FIG. 9, the protrusion 806 is smaller in the crosstrack direction (x-direction), although may be the same-sized or larger. The optical shield 802 may optionally include a cap such as indicated by region 604 in FIG. 6.

A coupler and leading magnetic shield were modeled to estimate performance versus a similar NFT without the coupler and shield. For purposes of comparison, a configuration as shown in FIGS. 3-5 was modeled. In such an arrangement, the coupler 306 and magnetic leading shield 406 work in a similar fashion as active magnetic shield designs, e.g., shields that have two sets of coils. A gap plasmon mode is created between the peg 302 of the NFT and the optical shield 308.

Figure 10:
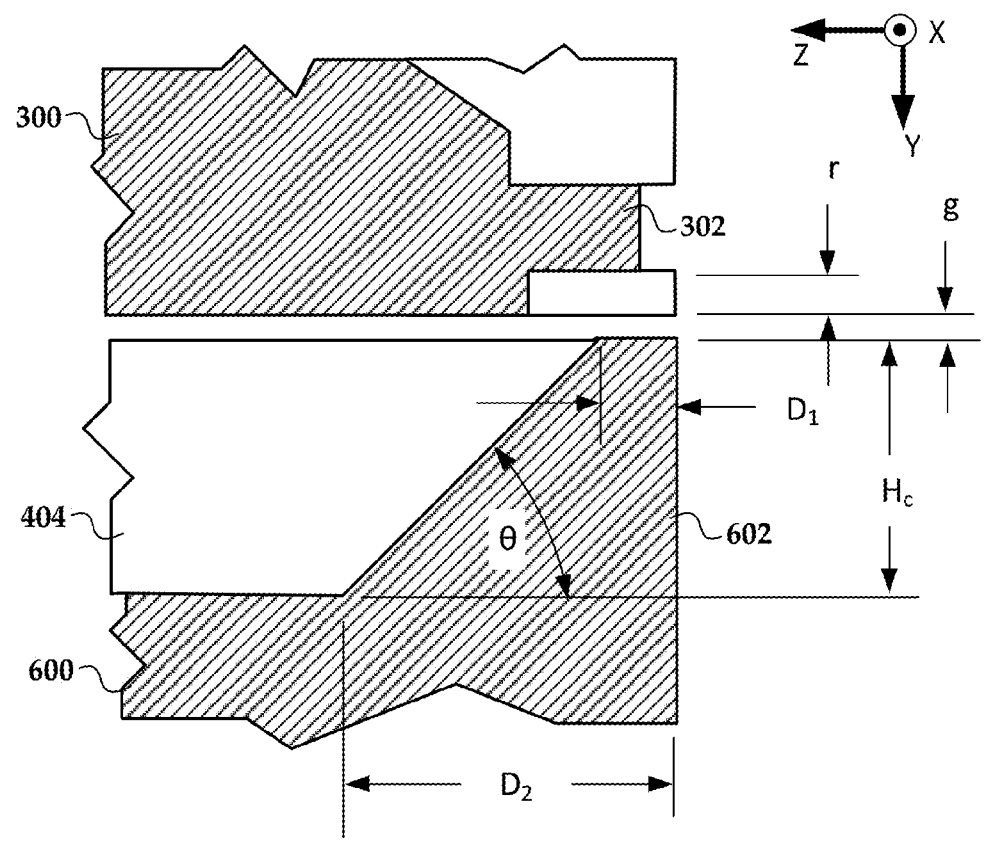
FIG. 10 is a close-up, cross-sectional view showing additional details of the coupler and surrounding components according to an example embodiment.

For the model, dimensions of the coupler 306 (see FIGS. 6 and 7) were $W_{bcd}$=500 nm, $H_{bcd}$=800 nm, and $L_{bcd}$=710 nm. The z- and x-dimensions of the enlarged portion 300 of the NFT were 500 nm and 400 nm, respectively. The cross sectional close up in FIG. 10 shows additional details of the optical shield 602, peg 302, and waveguide core 404. Core height $H_c$=120 nm and core 404 is formed of NbOx; shield dimensions $D_1$=40 nm and $D_2$=160 nm and θ=45°; y-dimension (thickness) of Rh peg 302 is 25 nm and peg 302 extends from enlarged portion 300 by 16 nm in the z-direction; and the peg 302 was set back r=25 nm from the bottom of the enlarged portion 300; gap dimension g=10 nm.

This modeling shows that thermal gradient improves significantly, e.g., from 4-5 K/nm in baseline case to 7-12 K/nm with the coupler 306 and shield 406. For this particular model, the thermal gradient is 11.9 K/nm in the downtrack direction and 10.4 K/nm in the crosstrack direction. The peg temperature was 350 K and power was 5.2 mW.

Figure 11:
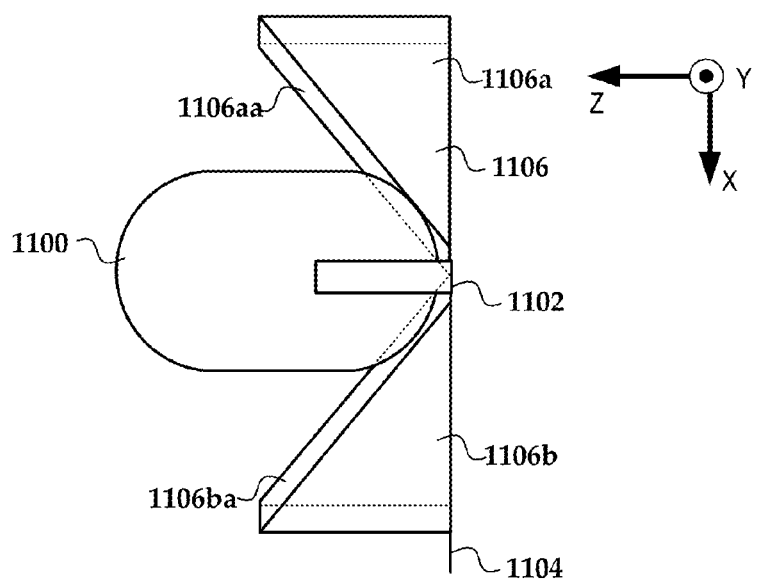
FIGS. 11 and 12 are top and surface-facing views showing a near-field transducer and plasmonic coupler arrangement according to another example embodiment.
Figure 12:
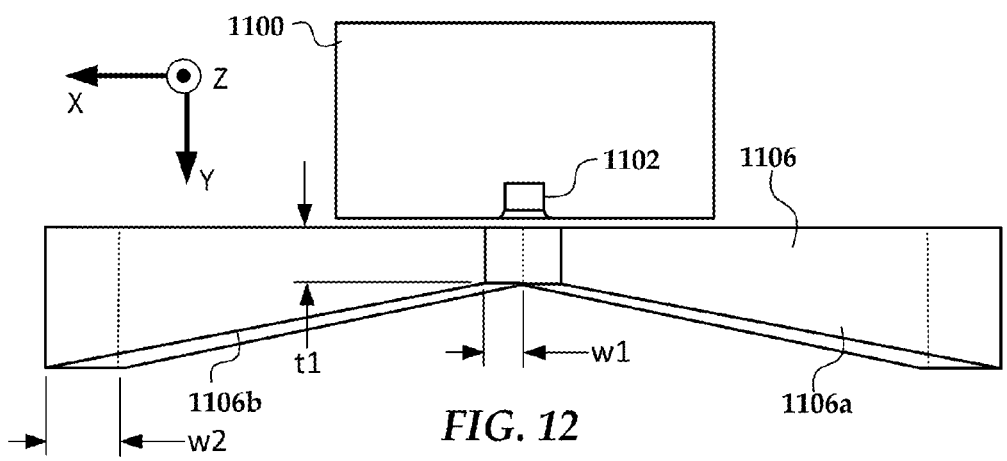

In FIGS. 11 and 12, respective top and surface-facing views show an NFT and coupler arrangement according to another example embodiment. An NFT includes an enlarged portion 1100 and a peg 1102 extending towards a media-facing surface 1104. As with previous embodiments, the enlarged portion 1100 is formed of a plasmonic material and has a stadium shape when viewed from a substrate-parallel plane, although other shapes may be used as described above. Similarly, the peg 1102 may be formed from the same material as the enlarged portion 1100 or a different material.

A plasmonic coupler 1106 is located downtrack of the NFT, e.g., in a core or cladding layer of a waveguide (not shown) that delivers energy to the NFT. In this example, the plasmonic coupler 1106 is configured to guide part of the light within the waveguide towards the NFT transducer as a surface plasmon. These surface plasmons generated at the plasmonic coupler are further going to interfere with the localized plasmon generated at the end of the NFT. This interference will sharpen the resulting hot-spot in the media, reducing its thermal gradient.

Figure 13:
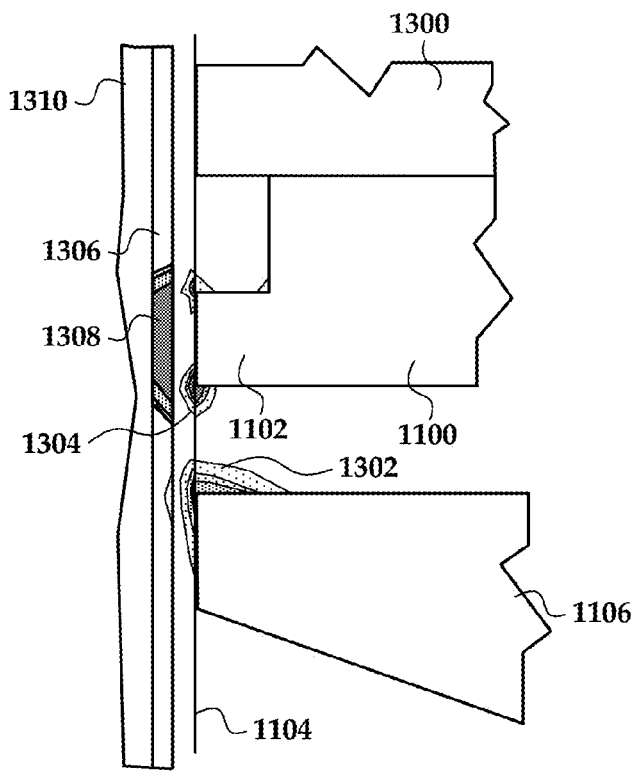
FIG. 13 is a diagram showing modeling results of the configuration shown in FIGS. 11 and 12.

The plasmonic coupler 1106 has two portions 1106a, 1106b with angled edges 1106aa, 1106ba that are tilted in the xz-plane. The portions 1106a, 1106b have a right-triangular shape with angled sides (hypotenuses) facing the NFT at a non-zero angle relative to the media-facing surface 1104. The propagating mode that is exciting the current NFT is a $TE_{01}$ and thus the main component of the electric field is within the xz-plane. Therefore, since surface plasmons are mainly coupled through an electric field component which is normal to the surface of propagation, light from the waveguide will be guided in the surface of the coupler towards the peg interfering with the field of the NFT. This is seen in FIG. 13, which shows results of modeling the configuration shown in FIGS. 11 and 12. For the modeling, the dimensions shown in FIG. 12 were selected as follows: w1=40 nm, w2=75 nm, and t1=60 nm. Both portions 1106a, 1106b are mirror images of one another about the yz-plane.

In FIG. 13, a write pole 1300 is shown near the NFT peg 1102 and plasmonic coupler 1106 at the media-facing surface 1104. The shaded areas indicate E-field strength due to excitation of the NFT and coupler 1106. Darker shading indicates higher field strength. The field at region 1302 which is generated at an edge of the coupler 1106 interferes with field at region 1304 at an edge of the peg 1102. This sharpens the thermal gradient of hotspot 1308 in layer 1306 of a recording medium 1310.

Figure 14:
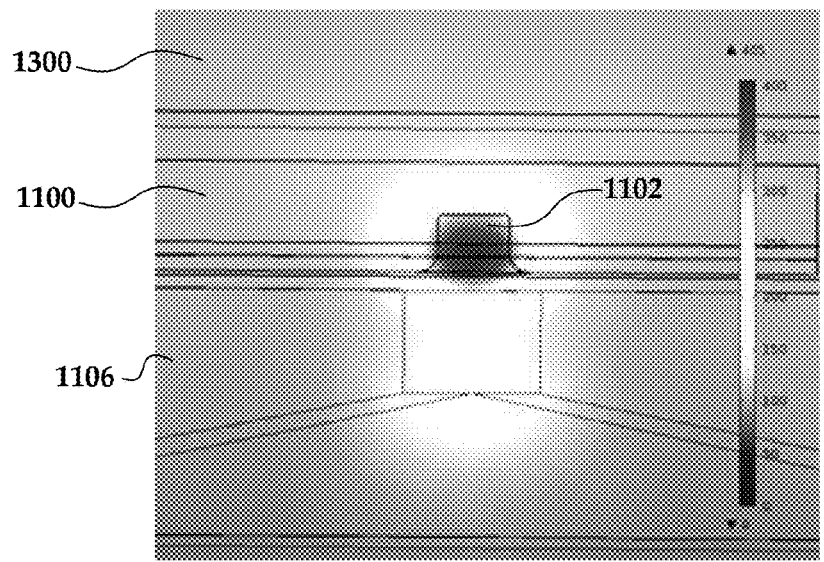
FIG. 14 is a thermal plot showing modeling results of the configuration shown in FIGS. 11 and 12.
Figure 15:
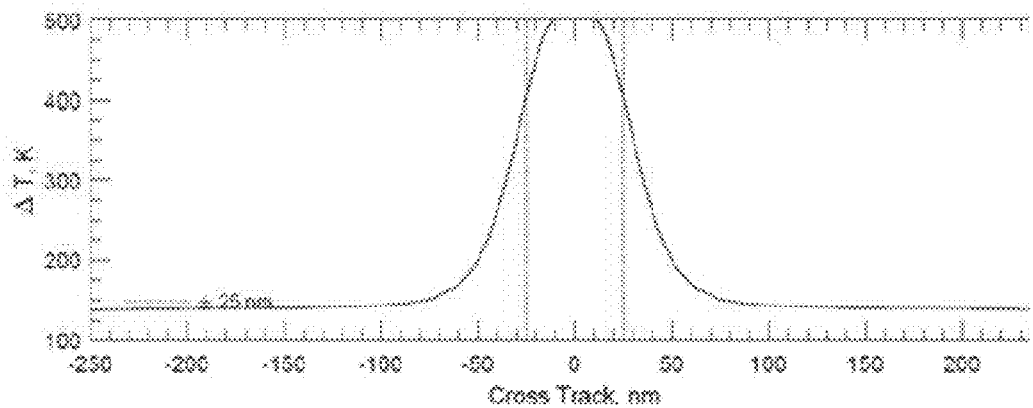
FIGS. 15 and 16 are graphs showing modeling results of the configuration shown in FIGS. 11 and 12.
Figure 16:
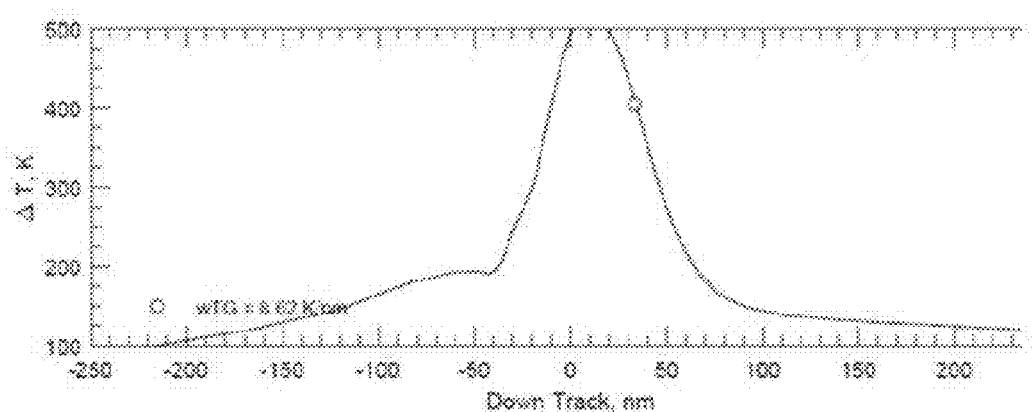

In FIG. 14, a thermal plot shows a view of the field profile on the media hotspot from the modeling. In FIGS. 15 and 16, graphs show respective crosstrack and downtrack thermal profile of the hotspot resulting from the modeling. In Table 1 below, the thermal gradient of the design with the coupler is compared to a design under the same conditions without a coupler. These results show that the plasmonic coupler converts the light from the waveguide to surface plasmons, which are further guided into the end of the NFT. The surface plasmons will interfere with the localized plasmon at the end of the NFT. In this way, uncoupled light from the waveguide is used to improve the thermal gradient of the resulting hot-spot.

TABLE 1

|  | Without coupler (K/nm) | With coupler (K/nm) |
| --- | --- | --- |
| Cross-track thermal gradient | 7.73 | 9.77 |
| Down-track thermal gradient | 7.54 | 8.61 |

It will be understood that the coupler embodiment shown in FIGS. 11-12 may also be used with a leading magnetic shield as previously described. Such a shield can be placed on a side of the coupler 1106 facing away from the NFT, and the coupler 1106 may also provide benefits such as acting as an active shield as previously described. Further some parts of the coupler 1106 (e.g., an edge facing the recording medium) may be coated with different materials to improve thermal or mechanical performance of the device.

Figure 17:
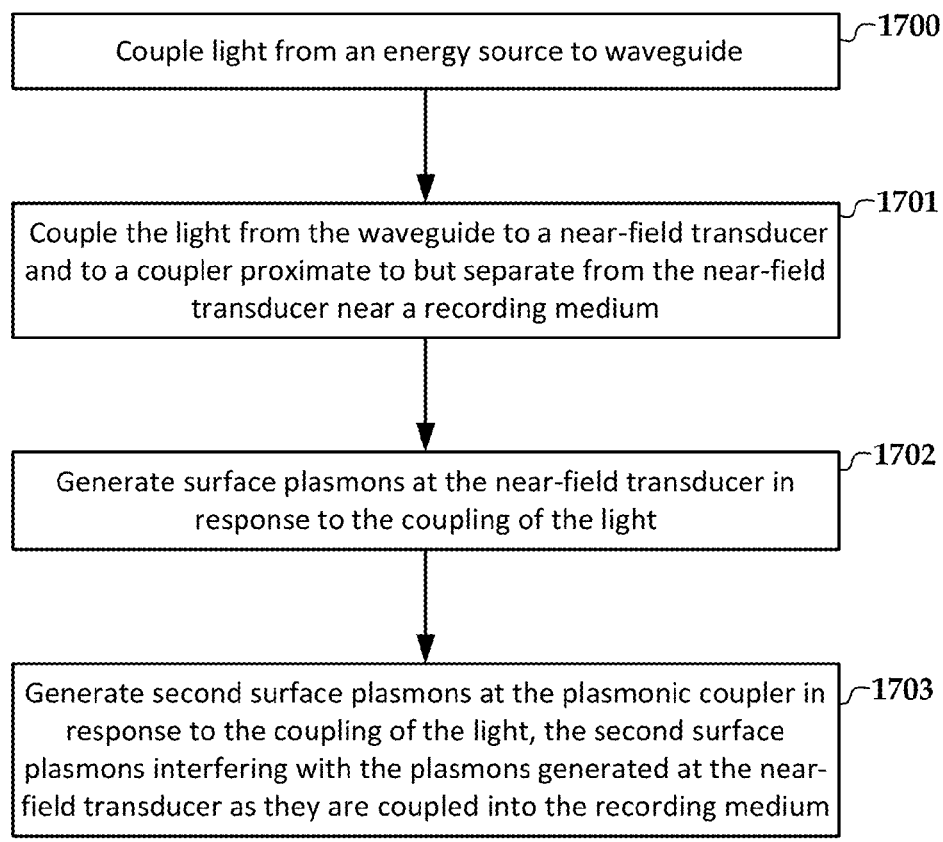
FIG. 17 is a flowchart illustrating a method according to an example embodiment.

In FIG. 17, a flowchart illustrates a method according to an example embodiment. The method involves coupling 1700 light from an energy source (e.g., a laser diode) to a waveguide. Light from the waveguide is coupled 1701 to a near-field transducer and to a coupler that proximate to but separate from the near-field transducer near a recording medium. Surface plasmons are generated 1702 at the near-field transducer in response to the coupling of the light. Second surface plasmons are generated 1703 at the plasmonic coupler in response to the coupling of the light. The second surface plasmons interfere with the plasmons generated at the near-field transducer as they are coupled into the recording medium. This interference can improve a thermal gradient of a hotspot on the medium formed by the near-field transducer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a near-field transducer comprising an enlarged portion formed of a plasmonic material and a peg extending from the enlarged portion towards a media-facing surface of the read/write head;
   a waveguide comprising a first cladding layer surrounding the near-field transducer, a core disposed on the first cladding layer, and a second cladding layer disposed on the core opposite the first cladding layer;
   a coupler formed of a second plasmonic material and disposed in the waveguide such that a first edge of the coupler is proximate the media-facing surface and a first side of the coupler faces and is spaced apart from the peg of the near-field transducer in a downtrack direction; and
   an optical shield extending from the first side of the coupler at the first edge and extending into the core towards the peg, the optical shield formed of the second plasmonic material, a gap between the optical shield and the peg of the near-field transducer creating a gap plasmon mode.

2. The apparatus of claim 1, further comprising a leading magnetic shield proximate a second side of the coupler that faces away from the first side.

3. The apparatus of claim 1, wherein the coupler is located in the second cladding layer.

4. The apparatus of claim 1, wherein a tip of the optical shield comprises a different material than the second plasmonic material, the different material comprising one of Rh, Pt, Pd, and Ru.

5. The apparatus of claim 1, wherein the first plasmonic material is the same as the second plasmonic material.

6. The apparatus of claim 1, wherein the coupler comprises a second, rounded edge facing away from the first edge, the first edge comprising a rectangular shape, and wherein the enlarged portion of the near-field transducer comprises a stadium shape.

7. The apparatus of claim 1, wherein the peg is made of a different material than the enlarged portion of the near-field transducer.

8. The apparatus of claim 1, wherein the coupler comprises first and second triangular portions with edges facing the near-field transducer at a non-zero angle relative to the media facing surface.

9. The apparatus of claim 8, wherein the coupler comprises a downtrack thickness at a minimum near the peg, the downtrack thickness increasing away from the peg in a crosstrack direction.

10. An apparatus comprising:
    a near-field transducer comprising a plate-like enlarged portion disposed on a first substrate parallel plane and a peg extending from the enlarged portion towards a media-facing surface;
    a plasmonic coupler separate from the near-field transducer on a second substrate parallel plane, the plasmonic coupler comprising two triangular sections separated by a gap, the two triangular sections comprising sides facing the near-field transducer at a non-zero angle relative to the media facing surface, the enlarged portion of the near-field transducer overlapping the gap, the two triangular sections joined underneath the peg of the near-field transducer such that the plasmonic coupler guides light from the waveguide to set up an electric field that interferes with a corresponding field excited by the peg of the near-field transducer, the interference with the corresponding field sharpening the corresponding electric field of the peg; and
    a waveguide that delivers the light to the near-field transducer and the plasmonic coupler.

11. The apparatus of claim 10, wherein the plasmonic coupler comprises a downtrack thickness at a minimum near the peg, the downtrack thickness increasing away from the peg in a crosstrack direction.

12. An apparatus, comprising:
    a near-field transducer comprising an enlarged portion formed of a plasmonic material and a peg extending from the enlarged portion towards a media-facing surface of the read/write head;
    a waveguide comprising a first cladding layer surrounding the near-field transducer, a core disposed on the first cladding layer, and a second cladding layer disposed on the core opposite the first cladding layer;
    a coupler formed of a second plasmonic material and disposed in the second cladding layer such that a first edge of the coupler is proximate the media-facing surface and first side of the coupler faces and is spaced apart from the peg of the near-field transducer in a downtrack direction, the coupler overlapping the enlarged portion of the near-field transducer, wherein the coupler comprises a second, rounded edge facing away from the first edge, the first edge comprising a rectangular shape, and wherein the enlarged portion of the near-field transducer comprises a stadium shape; and
    a leading magnetic shield proximate a second side of the coupler that faces away from the first side.

13. The apparatus of claim 12, further comprising an optical shield extending from the first side of the coupler at the first edge and extending into the core towards the peg, the optical shield formed of the second plasmonic material, a gap between the optical shield and the peg of the near-field transducer creating a gap plasmon mode.

14. The apparatus of claim 13, wherein a tip of the optical shield comprises a different material than the second plasmonic material, the different material comprising one of Rh, Pt, Pd, and Ru.

15. The apparatus of claim 13, wherein the optical shield comprises a wedge shape with a narrower portion proximate the peg and a wider portion proximate the coupler.

16. The apparatus of claim 12, wherein the first plasmonic material is the same as the second plasmonic material.

17. The apparatus of claim 12, wherein the peg is made of a different material than the enlarged portion of the near-field transducer.

18. The apparatus of claim 10, wherein the waveguide delivers the light in a $TE_{10}$ mode such that a main component of an electric field of the light is in a substrate parallel plane, such that surface plastrons are coupled from the plasmonic coupler to the peg in a direction normal to the substrate parallel plane.

\* \* \* \* \*